(12) United States Patent
Mayfield

(10) Patent No.: US 6,520,521 B2
(45) Date of Patent: Feb. 18, 2003

(54) TILTING TRAILER SUSPENSION

(76) Inventor: William Rodgers Mayfield, 1103 Collinwood St., Opelika, AL (US) 36801

( * ) Notice: Subject to any disclaimer, the term of this patent is extended or adjusted under 35 U.S.C. 154(b) by 0 days.

(21) Appl. No.: 09/793,904

(22) Filed: Feb. 27, 2001

(65) Prior Publication Data

US 2001/0033066 A1 Oct. 25, 2001

Related U.S. Application Data

(60) Provisional application No. 60/185,428, filed on Feb. 28, 2000.

(51) Int. Cl.[7] .................................................. B60G 3/14
(52) U.S. Cl. ..................... 280/124.106; 280/124.125; 280/124.128; 280/124.153; 414/482; 414/485
(58) Field of Search ..................... 280/124.106, 789, 280/124.125, 124.128, 124.153, 43.1, 43.24, 656; 414/482, 485, 483

(56) References Cited

U.S. PATENT DOCUMENTS

| | | | |
|---|---|---|---|
| 3,788,675 A | * | 1/1974 | Wilander |
| 4,659,100 A | * | 4/1987 | Welker |
| 4,685,855 A | * | 8/1987 | Celli |
| 5,474,416 A | * | 12/1995 | Rogge et al. |

* cited by examiner

Primary Examiner—Eric Culbreth

(57) ABSTRACT

A tilting trailer suspension which has forwardly disposed, independent swingarms pivotally attached to a trailer main platform and a second u-shaped perimeter frame attached to the rear portion of the swingarms and extending over the swingarms converging at a latching point on the trailer tongue. Each swingarm has a stub axle mounted at its forward end for wheel attachment. A spring is mounted between the forward end of each swingarm and the perimeter frame to provide suspension. Tilting is accomplished by unlatching the u-shaped perimeter frame from the tongue portion of the main frame and raising it so that the swingarms pivot about the connection to the main frame. The rearward end of the trailer platform drops to the ground at a low angle, while the u-shaped perimeter frame assumes an upwardly extending attitude.

4 Claims, 3 Drawing Sheets

TILTING TRAILER SUSPENSION

CROSS REFERENCE TO RELATED APPLICATIONS

This application claims the filing date of previously filed provisional application No. 60/185,428, filed Feb. 28, 2000.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF INVENTION

A tilting trailer is a unique and useful variation of a standard trailer. As with any trailer it is used to haul material and equipment and the tilting of the bed allows the user greater ease of loading and unloading cargo. Several configurations of tilting trailers have been invented in the past. A simple tilting trailer is configured with a standard axle (with its axis running through the wheels) and the bed tilts around that axle. This creates a tilting angle that is very steep and which may or may not be desirable. Where low tilt angles are desired, a trailer configuration with an offset axle is very effective and is the subject of the present invention. Such trailers are useful for the loading of rolling equipment such as lawnmowers and motorcycles where loading with a ramp is impractical.

The present invention is an improvement on the trailers described in U.S. Pat. No. 3,860,255 to Rodriguez, and U.S. Pat. No. 4,659,100 to Welker. These patents describe trailers with a configuration having two principle assemblies hingedly connected together towards the rear ends of the assemblies. A pair of stub axles mount wheels directly to the outer frame assembly. The tilting is accomplished by raising the forward portion of the outer frame assembly and thus raising the wheels and lowering the rear of the trailer to the ground.

Because the stub axles are rigidly affixed to the perimeter frame, they provide no effective suspension. Various suspension means have been devised for this configuration to alleviate to effects of rough terrain on the trailer. The aforementioned Welker patent uses a spring attachment for the forward portion of the outer frame so that it may move with variations in road surface. The limitation with this configuration that the distance between the spring and the stub axle means the full travel of the spring device will result in very little movement of the stub axles effectively eliminating any practical benefits of the suspension.

Other approaches have used leaf springs in an attempt to provide suspension for this type of trailer. Such approaches are exemplified in U.S. Pat. No. 3,746,195 to Beilke and U.S. Pat. No. 3,788,675. Leaf spring suspensions are inherently rough riding when unloaded and provide no damping effects unless also configured with a shock absorber.

It is an object of this invention to provide a suspension for a tilting trailer that provides better spring characteristics and damping qualities over prior art and does not limit the tilting capability of the trailer.

BRIEF SUMMARY OF THE INVENTION

A suspension configuration for a tilting trailer according to the present invention comprising a main load carrying deck with individual swingarms pivotally mounted to each side of the deck. Each swingarm is forwardly disposed and has a stub axle mounted to the forward end for wheel attachment. Tilting means comprises a generally U-shaped frame pivotally mounted to the rearward end of each swingarm and extending over each swingarm to a latch point at the front portion of the main deck. A resilient spring means is affixed between the bottom portion of the U-shaped frame and the top of each swingarm near the stub axles.

BRIEF DESCRIPTION OF THE SEVERAL VIEWS OF THE DRAWING

The objects, advantages, and features will become apparent with reference to the description and drawings below, in which like numerals represent like elements and in which:

FIG. 7 is a partial elevation view of a detail of the alternative embodiment in

FIG. 6 in the deflected position.

DETAILED DESCRIPTION

Figure 1:
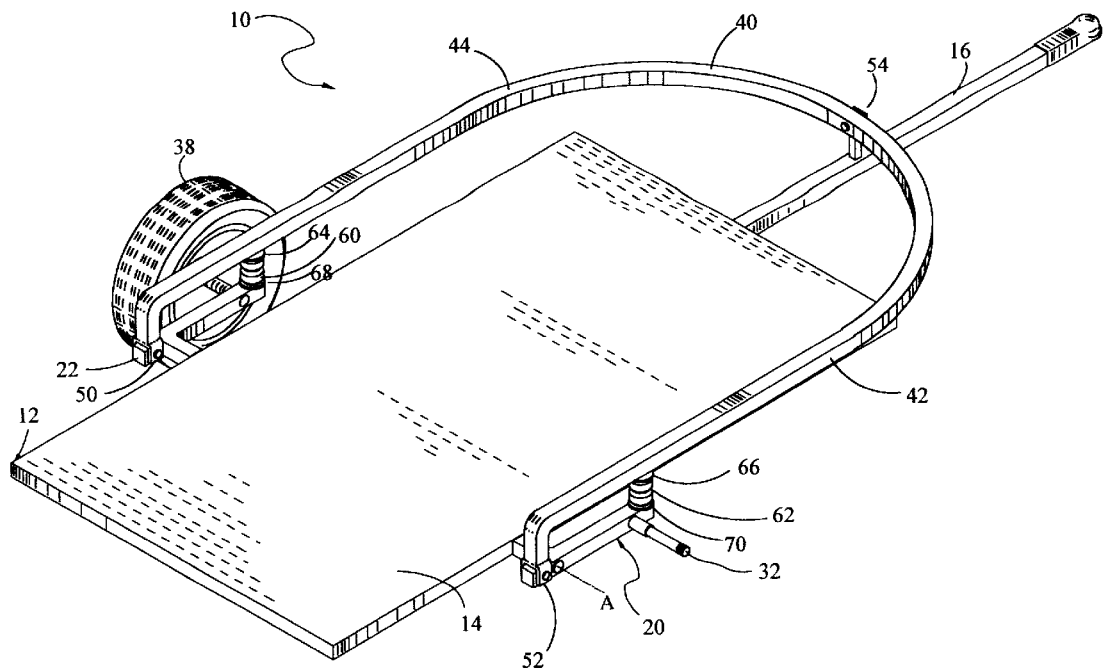
FIG. 1 is a perspective view of an improved trailer according to the present invention.
Figure 2:
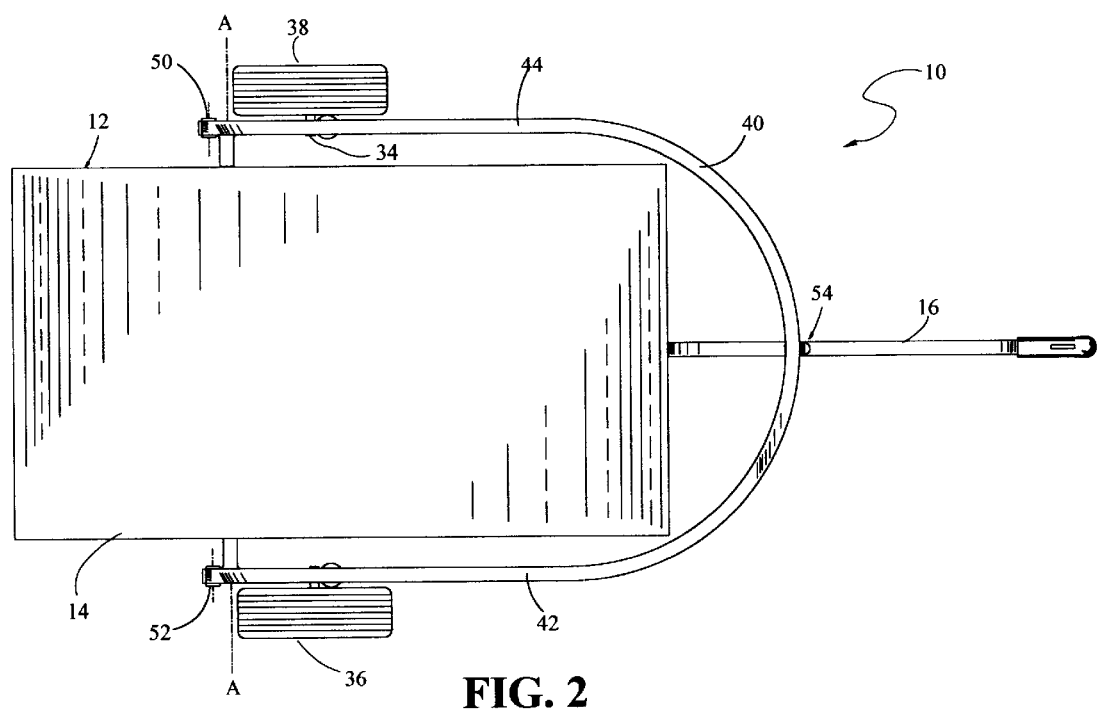
FIG. 2 is a plan view of the trailer.

With reference to the drawings in which like reference numerals designate like or corresponding parts throughout the various views and with particular reference to FIGS. 1 and 2, the tilting trailer of the present invention is designated generally at 10. The trailer 10 includes a main frame 12 comprised of a rear, load carrying portion 14 and a forwardly extending tongue portion 16 with means for attachment to a towing vehicle. Attached to each side of the enlarged rear portion 14 are forwardly disposed swingarms 20, 22 rotatable about axis designated at A. A pair of axially aligned stub axles 32, 34 are fixed to the forward end and extend outwardly from the respective swingarms 20, 22 to mount wheels 36, 38.

Figure 7:
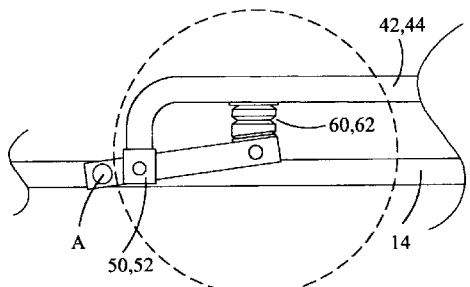
Figure 8:
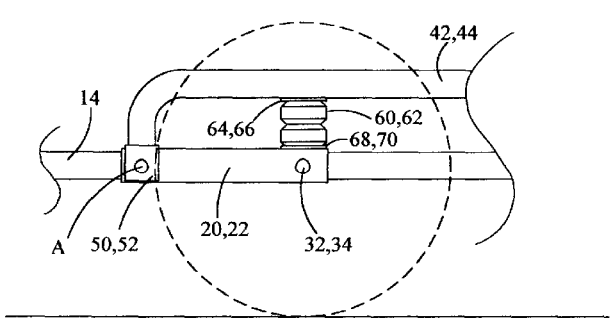
FIG. 8 is a partial elevation view of the "coaxial" alternative embodiment.
Figure 9:
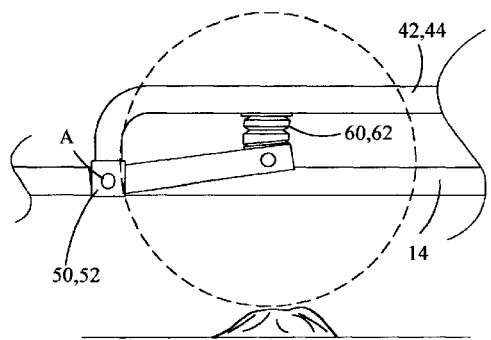
FIG. 9 is a partial elevation view of the "coaxial" embodiment in FIG. 8 in the deflected positions

A secondary frame, generally indicated at 40, with forwardly converging parallel side rails 42, 44, is rotatably mounted to the rearward end of swingarms 20, 22 by a pair of journals 50, 52. Said side rails 42, 44 extend over the swingarms 20, 22 converge generally over the tongue portion 16 and attach to said tongue 16 by suitably articulating latch means such as the pin 54. Journals 50, 52 may be located rearward of axis A as in FIGS. 1 through 5, or concentric with axis A as shown in FIGS. 8 and 9, or forward of axis A as in FIGS. 6 and 7.

The suspension of trailer 10 also includes a spring means 60, 62 which are positioned between the swingarms 20, 22 and the parallel side rails 42, 44 at a position generally over the outwardly disposed wheel spindles 32, 34. Springs 60, 62 are preferably blocks or "biscuits" of elastomeric material. The upper face of springs 60, 62 bear against or abut the underside of plates 64, 66. The lower face of springs 60,62 bear against the upper surface of plates 68, 70 which are affixed to the forward end of swingarms 20, 22. Conventional coil springs, not shown, may be used if desired.

Figure 3:
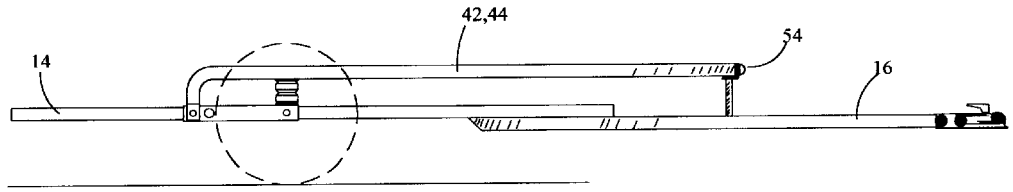
FIG. 3 is an elevation view of the trailer in the normal towing configuration with undeflected suspension.
Figure 4:
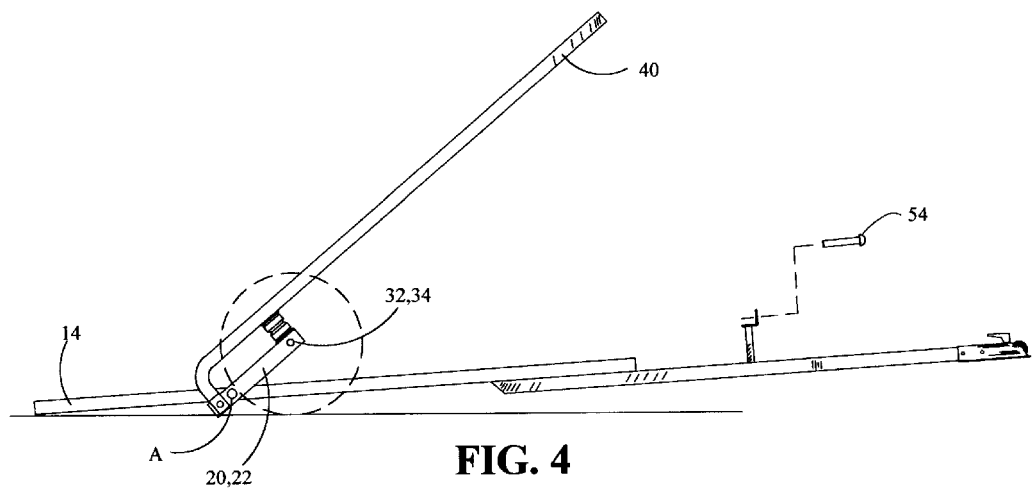
FIG. 4 is an elevation view of the trailer in the tilted position.

From the position in FIG. 3, tilting the trailer is accomplished by disengaging latch means 54 which allows the secondary frame 40 and the swingarms 20,22 to rotate upward about the wheel axis 32,34 as the swingarm pivots about axis A resulting in the main load carrying frame 14 lowering to the ground. FIG. 4 shows the trailer in the tilted position.

Figure 5:
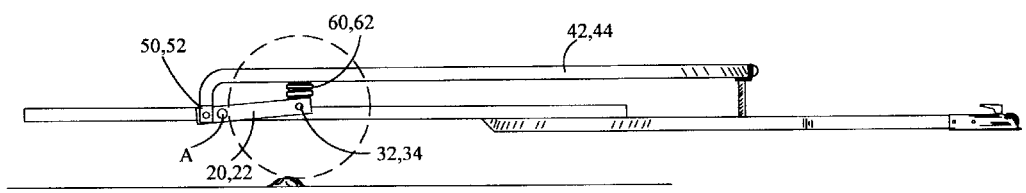
FIG. 5 is an elevation view of the trailer with a suspension deflection.

The suspension operates when the road going wheels encounter loads that are transmitted through the wheel spindles 32,34 into swingarms 20,22. Said swingarms rotate upward about axis A resulting in compression of springs 60,62 as shown in FIG. 5. It can be seen in FIG. 5 that upward movement of the forward portion of swingarms 20,22 results in rotation of swingarms about axis A and slight downward movement of journal 50,52 and side rails 42,44. This configuration will give a somewhat progressive action to the suspension because of the scissor action between swingarm 20,22 and frame rails 42,44.

Figure 6:
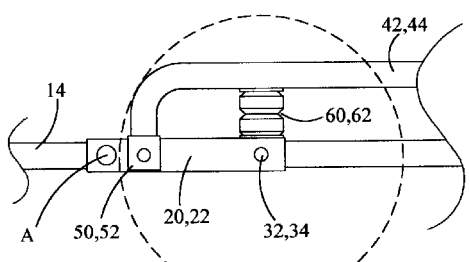
FIG. 6 is a partial elevation view of a detail of an alternative embodiment in the deflected position.

An alternative configuration is shown in FIG. 6 where the side rails 42,44 are attached by journals 50,52 to a point forward of axis A. Upward movement of the wheel spindles 32,34 will result in slight upward movement of the journals 50,52 and side rails 42,44 as shown in FIG. 7. This configuration will result in less compression of the spring 60,62 than in the configuration shown in FIG. 5. A firmer spring can be used or the spring can be located more forwardly or rearwardly to affect a change in suspension characteristics.

An alternative configuration shown in FIGS. 8 and 9 has the journal 50,52 concentric with the axis A. This would eliminate any vertical movement of side rails 42,44 when the swingarm 20,22 pivot under suspension loads.

I claim:
1. A suspension system in combination with a tilting bed trailer apparatus comprising generally:
   a. A load carrying deck with a front end and a rearward end, said deck having a forwardly extending tongue portion, said tongue portion having means for attachment to a tow vehicle;
   b. A generally U-shaped perimeter frame with parallel side rails opened in the rear, said rails extending forward and converging at the forward end of said load carrying deck; means to latch said U-shaped frame to a location on said forwardly extending tongue
   c. A pair of longitudinally oriented swingarms pivotally mounted to the sides of said load carrying deck, having outwardly disposed stub axles for wheel attachment located forward of said swingarm mounting location; means to pivotally attach said U-shaped perimeter frame to said swingarms at locations said swingarm mounting location,
   d. A spring means affixed between each said parallel side rail and each said swingarm.
2. The trailer suspension system of claim 1 wherein the attachment of said U-shaped frame to said swingarms is co-axial with said pivotal attachment of said swingarm to said load carrying deck.
3. The trailer suspension system of claim 1 wherein the attachment of said U-shaped frame to said swingarms is directly forward of said pivotal attachment of said swingarm to said load carrying deck.
4. The trailer suspension system of claim 1 wherein the attachment of said U-shaped frame to said swingarms is directly behind of said pivotal attachment of said swingarm to said load carrying deck.

* * * * *